US011979718B2

(12) United States Patent
Dy et al.

(10) Patent No.: US 11,979,718 B2
(45) Date of Patent: May 7, 2024

(54) CONTACT HEARING DEVICE AND RETENTION STRUCTURE MATERIALS

(71) Applicant: Earlens Corporation, Menlo Park, CA (US)

(72) Inventors: Peter Dy, Milpitas, CA (US); Rodney Perkins, Woodside, CA (US); James Silver, Palo Alto, CA (US); Jake Olsen, Palo Alto, CA (US); Paul Rucker, San Francisco, CA (US); Kyle Imatani, Mountain View, CA (US); Bryan Flaherty, Mountain View, CA (US); Daniel Hallock, Redwood City, CA (US); Iljong Lee, Saratoga, CA (US); Ketan Muni, San Jose, CA (US)

(73) Assignee: Earlens Corporation, Menlo Park, CA (US)

( * ) Notice: Subject to any disclaimer, the term of this patent is extended or adjusted under 35 U.S.C. 154(b) by 0 days.

(21) Appl. No.: 17/963,682

(22) Filed: Oct. 11, 2022

(65) Prior Publication Data

US 2023/0319493 A1 Oct. 5, 2023

Related U.S. Application Data

(63) Continuation of application No. 17/007,800, filed on Aug. 31, 2020, now Pat. No. 11,516,603, which is a continuation of application No. PCT/US2019/020942, filed on Mar. 6, 2019.

(60) Provisional application No. 62/639,796, filed on Mar. 7, 2018.

(51) Int. Cl.
*H04R 25/00* (2006.01)
*H04R 31/00* (2006.01)

(52) U.S. Cl.
CPC ......... *H04R 25/604* (2013.01); *H04R 25/652* (2013.01); *H04R 31/00* (2013.01); *H04R 2231/003* (2013.01)

(58) Field of Classification Search
CPC H04R 25/505; H04R 25/554; H04R 2225/55; H04R 2430/01; H04R 25/70; H04R 25/55
See application file for complete search history.

(56) References Cited

U.S. PATENT DOCUMENTS

| | | | | |
|---|---|---|---|---|
| 5,979,589 A * | 11/1999 | Aceti | A61B 5/6817 | 381/328 |
| 6,940,989 B1 * | 9/2005 | Shennib | H04R 25/606 | 381/328 |
| 2017/0094426 A1 * | 3/2017 | Shen | H04R 25/02 | |

* cited by examiner

*Primary Examiner* — Amir H Etesam
(74) *Attorney, Agent, or Firm* — Polsinelli PC

(57) ABSTRACT

Hearing aid devices, methods of manufacture, methods of use, and kits are provided. In certain aspects, the hearing aid devices comprise an apparatus having a transducer and a retention structure comprising a shape profile corresponding to a tissue of the user, and a layer of elastomer.

16 Claims, 6 Drawing Sheets

CONTACT HEARING DEVICE AND RETENTION STRUCTURE MATERIALS

CROSS REFERENCE TO RELATED APPLICATIONS

This application is a continuation of U.S. patent application Ser. No. 17/007,800, filed Aug. 31, 2020, now U.S. Pat. No. 11,516,603; which is a continuation of PCT Application No. PCT/US19/20942, filed Mar. 6, 2019; which claims priority to U.S. Provisional Application No. 62/639,796, filed Mar. 7, 2018; the contents of which are incorporated herein by reference in their entirety.

BACKGROUND OF THE INVENTION

Field of the Invention

The present invention relates to the use of select materials in the sulcus and umbo platform of a contact hearing aid device and, more particularly, to the use of materials having specific characteristics which improve the performance of the contact hearing aid devices.

Background

A contact hearing system is a system including a contact hearing device, an ear tip and an audio processor. Contact hearing systems may also include an external communication device. An example of such system is an Earlens hearing-aid. In the Earlens system, audio is received by an audio processor and transmitted by laser to a contact hearing device which is placed on the ear drum of a user.

A contact hearing device, which may also be referred to as a tympanic contact actuator or tympanic lens, includes a tiny actuator connected to a customized ring-shaped support platform that floats on the ear canal around the eardrum. The contact hearing device resides in the ear much like a contact lens resides on the surface of the eye. In a contact hearing device, an actuator directly vibrates the eardrum which causes energy to be transmitted through the middle and inner ears to stimulate the brain and produce the perception of sound. The contact hearing device may comprise a photodetector, a microactuator connected to the photodetector, and a support structure supporting the photodetector and microactuator. The contact hearing device may comprise a photodetector, a transducer connected to the photodetector, and a support structure for supporting the photodetector and the transducer. The contact hearing device may comprise a receive coil, a microactuator connected to the receive coil, and a support structure supporting the receive coil and microactuator. The contact hearing device may comprise a receive coil, a transducer connected to the receive coil, and a support structure supporting the receive coil and transducer. In alternate embodiments, the contact hearing device may include one or more coils and one or more antennas.

The Earlens contact hearing device is secured in the ear canal by using a perimeter platform, which may also be referred to as a sulcus platform, made out of a thin film of Parylene™ C. In this design, the perimeter platform surrounds the transducer and supports its position within the ear canal. In U.S. Pat. No. 9,392,377 to Olsen et al., this perimeter platform is described as being made from poly (para-xylylene) (Parylene™-N), or variants thereof, such as poly(chloro-p-xylene) (Parylene™ C), poly(p-xylene), poly (dichloro-p-xylene) (Parylene™ D), or fluorinated poly(p-xylene) (Parylene™ F). However, when a contact hearing device including a perimeter platform made from any of those materials is delivered through the ear canal it may be difficult to avoid deforming or wrinkling the Parylene™. Such wrinkles may result in permanent deformation of the intended perimeter platform geometry, and may therefore reduce the ability of the perimeter platform and, thus, the contact hearing device to resist displacement. When a displacement occurs, the contact hearing device moves from its optimal position adjacent the tympanic membrane to a new position. Movement of the contact hearing device to a new position may result in deterioration of the performance of the hearing aid. It has been observed clinically that there is a strong correlation between wrinkling of the material making up the perimeter platform and displacement, resulting in unacceptable hearing aid performance when wrinkles are present.

In a contact hearing system, a microactuator may be placed on a subject's tympanic membrane (ear drum) such that the microactuator vibrates the tympanic membrane in response to an external signal. Generally, the external signal is an acoustic signal which is converted to an electronic signal in a signal processor which forms a part of the contact hearing aid system. The electronic signal may then be converted to an optical signal. The optical signal may be transmitted to a photodetector which then converts the optical signal to mechanical motion by means of the microactuator. However, to insure optimum signal transduction between the microactuator and the tympanic membrane, the microactuator must remain in close proximity to its designed position. In the prior art system, the microactuator may be secured in position using a perimeter platform made of Parylene™ or a Parylene™ variant, such as, Parylene™ C.

One of the limitations of Parylene™ as a perimeter platform is that, once it is deformed it does not completely recover from that deformation. Deformation may occur under a number of circumstances, such as when the contact hearing device is delivered through a subject's ear canal to the tympanic membrane. Once the Parylene™ platform is deformed, it does not return to its pre-deformation shape and the resulting geometry of the perimeter platform is therefore different from the anatomy of the subject. If the perimeter platform is deformed and no longer conforms to the anatomy of the user, the contact hearing device may be more likely to become displaced from its intended position. When a contact hearing device becomes displaced, signal transduction may be impeded, resulting in reduced hearing improvement.

A perimeter platform may also be designed to ensure that the platform does not cause injury to tissues in the ear through the application of excessive pressure. Thus, the perimeter platforms may be designed to apply a slight pressure to surrounding tissue when it is placed in the ear. In particular, with the perimeter platform in place, capillaries in the surrounding tissue remain capable of re-filling with blood during each cardiac cycle. In general, the perimeter platform would be designed to apply a pressure of less than about 20 mm Hg. In order to meet this requirement, the hardness and geometry of the perimeter platform may be controlled so that it does not impose significant pressure upon the tissue.

A perimeter platform may also be made from materials which do not degrade or lose function after prolonged periods in the ear canal. Such materials would preferably be biocompatible, including meeting preset requirements for cytotoxicity, irritation and sensitization.

A perimeter platform may also be made from materials which do not swell substantially or gain weight after prolonged periods in an ear canal. Prolonged periods in an ear canal should not cause significant dimensional changes in materials used in a perimeter platform as such dimensional changes (e.g., changes in material thickness or weight) may have detrimental consequences, leading to, for example, displacement of the contact hearing device. Dimensional stability is particularly important because a precise fit is required to insure that the contact hearing device remains in its position on the ear.

SUMMARY OF THE INVENTION

The present disclosure provides apparatus having a transducer and a retention structure comprising a shape profile corresponding to a tissue of a user, and a layer of elastomer. The disclosure also provides alternate apparatus, methods of manufacture, methods of use, and kits.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In various aspects, the present disclosure provides an apparatus for placement with a user, the apparatus comprising: a transducer; and a retention structure comprising: a shape profile corresponding to a tissue of the user to couple the transducer to the user, wherein the retention structure maintains a location of the transducer when coupled to the user; and a layer of elastomer, wherein the elastomer has a hardness of between 0 A and 100 A, and a thickness of between approximately 25 microns and approximately 500 microns.

In some aspects, the elastomer has a Young's modulus of between 0.5 MPa and 50 MPa. In some aspects, the elastomer has a hardness of between approximately 25 A and approximately 95 A. In some aspects, the elastomer has an ultimate tensile strength of between 0.5 MPa and 5.0 MPa, or the elastomer has an ultimate tensile strength of between 5 MPa and 50 MPa. In some aspects, the layer of elastomer has a thickness of between approximately 25 microns and approximately 500 microns. In some aspects, the elastomer has an ultimate tensile strength of between approximately 1 MPa and approximately 300 MPa, between approximately 20 MPa and approximately 100 MPa, or between approximately 40 MPa and approximately 60 MPa at an elongation of approximately 650%. In some aspects, the elastomer has a tensile stress of between approximately 2.0 MPa and approximately 4.0 MPa at 50% elongation. In some aspects, the elastomer has a tensile stress of between approximately 3.0 MPa and approximately 5.0 MPa at 100% elongation.

In some aspects, the layer of elastomer has a change in Young's Modulus of less than 15%, less than 50%, or less than 75%, compared to a reference layer of elastomer following exposure to a test bath for 16 days at 37° C., the test bath comprising 10 wt % Synthetic Cerumen, 10 wt % EN1811 Sweat, and 80 wt % mineral oil. In some aspects, the layer of elastomer has a change in weight of less than 30% compared to a reference layer of elastomer, following exposure to a test bath for 16 days at 37° C., the test bath comprising 10 wt % Synthetic Cerumen, 10 wt % EN1811 Sweat, and 80 wt % mineral oil. In some aspects, the layer of elastomer has a change in wall thickness of less than 15% compared to a reference layer of elastomer, following exposure to a test bath for 16 days at 37° C., the test bath comprising 10 wt % Synthetic Cerumen, 10 wt % EN1811 Sweat, and 80 wt % mineral oil.

In some aspects, the layer of elastomer further comprises between approximately 5% and approximately 15% polydimethylsiloxane by weight, or wherein the platform material comprises between approximately 9% and approximately 11% polydimethylsiloxane by weight. In some aspects, the layer of elastomer comprises a polyurethane, a polycarbonate urethane with a silicone rubber soft segment, a polycarbonate urethane, an aromatic polyurethane, a fluoropolymer, a polyetherurethane, a nylon, a polyetherblockamide, an aliphatic polyetherurethane, a propylene, a propylene with rubber, or any combination thereof. In some aspects, the layer of elastomer comprises a polycarbonate-based silicone elastomer, a polycarbonate urethane with poly(dimethylsiloxane) soft segment, a fluoropolymer, THV [poly(tetrafluoroethylene-co-hexafluoropropylene-co-vinylidene fluoride)], a polycarbonate urethane-co-poly(dimethyl siloxane), any derivative thereof, or any combination thereof. In some aspects, the layer of elastomer comprises one or more of aliphatic polycarbonate-based thermoplastic urethane, polycarbonate urethane with poly(dimethyl siloxane) soft segment, and polycarbonate urethane-co-poly (dimethyl siloxane).

In some aspects, the retention structure comprises a curved portion having an inner surface toward an eardrum of the patient when placed, and wherein the curved portion couples to an ear canal wall of the patient, oriented toward the eardrum when placed to couple the transducer to the eardrum. In some aspects, the curved portion couples to the ear canal on a first side of the ear canal opposite the eardrum, and wherein a second portion of the retention structure couples to a second side of the ear canal opposite the first side to hold the retention structure in the ear canal. In some aspects, the curved portion and the second portion are connected so as to define an aperture extending therebetween to view at least a portion of the eardrum when the curved portion couples to the first side of the ear canal and the second portion couples to the second side.

In some aspects, the retention structure includes ridges along a tissue facing surface. In some aspects, the ridges are formed as part of a three dimensional printing process. In some aspects, the three dimensionally printed component is a mold used to form the layer of elastomer.

In some aspects, the layer of elastomer has a surface air-water contact angle of between approximately 100 degrees and approximately 130 degrees, or wherein the layer of elastomer has a surface air-water contact angle of between approximately 115 degrees and approximately 125 degrees, or wherein the layer of elastomer has a surface air-water contact angle of between approximately 20 degrees and approximately 80 degrees.

In some aspects, the apparatus further comprises an umbo platform, wherein the umbo platform comprises one or more of polycarbonate urethane with poly(dimethyl siloxane) soft segment or polycarbonate urethane-co-poly(dimethyl siloxane). In some aspects, the apparatus further comprises a coating polymer, the coating polymer comprising a poly (p-xylylene) polymer. In some aspects, the elastomer has a hardness of between 65 A and 100 A In various aspects, the present disclosure provides a method of treating a user in need of a hearing device, the method comprising: providing the user with an apparatus for placement with a user, the apparatus comprising: a transducer; and a retention structure comprising: a shape profile corresponding to a tissue of the user to couple the transducer to the user, wherein the retention structure maintains a location of the transducer when coupled to the user; and a layer of elastomer, wherein the elastomer has a hardness of between 0 A and 100 A, and a thickness of between approximately 25 microns and approximately 500 microns; and inserting the apparatus into an ear of the user, such that the transducer is in proximity to the eardrum of the user. In some aspects, the method further comprises the step of administering mineral oil to the apparatus, to the ear of the user, or any combination thereof.

In various aspects, the present disclosure provides a kit, the kit comprising: an apparatus for placement with a user, the apparatus comprising: a transducer; and a retention structure comprising: a shape profile corresponding to a tissue of the user to couple the transducer to the user, wherein the retention structure maintains a location of the transducer when coupled to the user; and a layer of elastomer, wherein the elastomer has a hardness of between 0 A and 100 A, and a thickness of between approximately 25 microns and approximately 500 microns; and instructions for use of the apparatus. In some aspects, the kit further comprises mineral oil.

In various aspects, the present disclosure provides a method of manufacturing an apparatus for placement with a user, the apparatus comprising: a transducer; and a retention structure comprising: a shape profile corresponding to a tissue of the user to couple the transducer to the user, wherein the retention structure maintains a location of the transducer when coupled to the user; and a layer of elastomer, wherein the elastomer has a hardness of between 0 A and 100 A, and a thickness of between approximately 25 microns and approximately 500 microns, the method comprising an injection molding process.

In various aspects, the present disclosure provides a method of manufacturing an apparatus for placement with a user, the apparatus comprising: a transducer; and a retention structure comprising: a shape profile corresponding to a tissue of the user to couple the transducer to the user, wherein the retention structure maintains a location of the transducer when coupled to the user; and a layer of elastomer, wherein the elastomer has a hardness of between 0 A and 100 A, and a thickness of between approximately 25 microns and approximately 500 microns, the method comprising a solvent coating process.

In various aspects, the present disclosure provides a method of manufacturing an apparatus for placement with a user, the apparatus comprising: a transducer; and a retention structure comprising: a shape profile corresponding to a tissue of the user to couple the transducer to the user, wherein the retention structure maintains a location of the transducer when coupled to the user; and a layer of elastomer, wherein the elastomer has a hardness of between 0 A and 100 A, and a thickness of between approximately 25 microns and approximately 500 microns, the method comprising a 3D printing process.

BRIEF DESCRIPTION OF THE DRAWINGS

The foregoing and other objects, features and advantages of embodiments of the present inventive concepts will be apparent from the more particular description of preferred embodiments, as illustrated in the accompanying drawings in which like reference characters refer to the same or like elements. The drawings are not necessarily to scale, emphasis instead being placed upon illustrating the principles of the preferred embodiments.

DETAILED DESCRIPTION OF THE INVENTION

Figure 1:
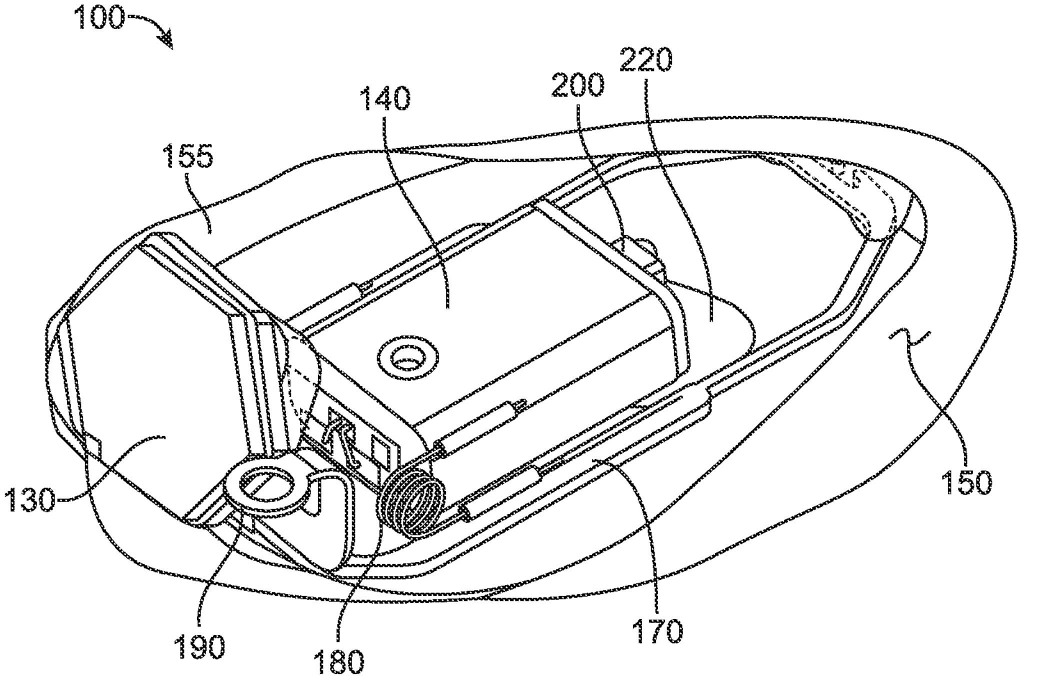
FIG. 1 is a top view of a contact hearing device according to the present invention.

In some embodiments, the present invention discloses an apparatus for placement with a user. In certain embodiments, the apparatus comprises a transducer and a retention structure, wherein the retention structure comprises a shape profile and a platform material, wherein the retention structure comprises a resilient retention structure to maintain a location of the transducer when coupled to the user, wherein the platform material has a thickness to resist deflection away from the shape profile, and wherein the platform material comprises the shape profile in an unloaded configuration. In some embodiments, the platform material comprises a layer of elastomer. In certain embodiments, the apparatus comprises a transducer and a retention structure, wherein the retention structure comprises a layer of elastomer, and wherein the layer of elastomer has a shape profile, wherein the retention structure comprises a resilient retention structure to maintain a location of the transducer when coupled to the user, wherein the elastomer has a thickness to resist deflection away from the shape profile, and wherein the elastomer comprises the shape profile in an unloaded configuration. In some embodiments, the elastomer may be coated with a coating polymer, such as a poly(p-xylylene) polymer (e.g., a Parylene™) or derivative thereof.

In some embodiments, the elastomer has a shape profile corresponding to a tissue of the user to couple the transducer to the user. As a non-limiting example, the retention structure can comprise a shape profile corresponding with the ear canal of the user, the concha of the user, the umbo of the user, the antihelix of the user, the triangular fossa of the user, the external auditory meatus of the user, the tragus of the user, the antitragus of the user, the scapha of the user, or any combination thereof. In some embodiments, the substrate has a shape profile corresponding to the tissue of the user. In some embodiments, the substrate has a shape profile corresponding to the ear canal tissue of a user. In certain embodiments, at least a portion of the substrate has a shape profile corresponding to the sulcus region of the ear canal of a user.

In some embodiments, the retention structure comprises a curved portion having an inner surface toward an eardrum of the patient when placed. In some embodiments, the retention structure comprises a curved portion having an inner surface directed toward the eardrum of the patient when placed onto the patient's ear. In some embodiments, the curved portion couples to an ear canal wall and is oriented toward the eardrum when placed. In some embodiments, the apparatus further comprises a transducer. In some embodiments, the transducer comprises an actuator. In certain embodiments, the actuator is a microactuator. In certain embodiments, the transducer comprises a microactuator, such as a balanced armature microactuator. In some embodiments, the transducer comprises a piezoelectric transducer. In certain embodiments, the transducer is a piezoelectric transducer. In certain embodiments, the apparatus is placed to couple the actuator to the eardrum. In some embodiments, the curved portion of the apparatus couples to the ear canal on a first side of the ear canal opposite the eardrum, and a second portion of the retention structure couples to a second side of the ear canal opposite the first side to hold the retention structure in the ear canal. In some embodiments, the curved portion of the apparatus and the second portion are connected so as to define an aperture extending therebetween. In some embodiments, the curved portion couples to the first side of the ear canal and the second portion couples to the second side.

In some embodiments, the apparatus comprises an output transducer assembly comprising a transducer. The output transducer assembly may be configured for placement in the medial ear canal, and is also referred to as a medial ear canal assembly. The output transducer assembly can receive a sound input, for example an audio sound or an input from an external communication device. With hearing aids for hearing impaired individuals, the input can be ambient sound. The external communication device may comprise at least one input transducer, for example a microphone. The at least one input transducer may comprise a second microphone located away from the first microphone, in the ear canal or the ear canal opening, for example positioned on a sound processor. The at least one input transducer assembly may also include a suitable amplifier or other electronic interface. In some embodiments, the input may comprise an electronic sound signal from a sound producing or receiving device, such as a telephone, a cellular telephone, a Bluetooth connection, a ratio, a digital audio unit, and the like.

In some embodiments of the invention, the output transducer assembly comprises a transducer, a photodetector, a spring, a support structure, and a retention structure.

In some embodiments of the invention, the output transducer assembly is adapted to receive the output form the input transducer assembly and produce mechanical vibrations in response to the received information, which may be, for example, in the form of a light signal generated by a lateral ear canal assembly. In some embodiments of the invention, the medial ear canal assembly or output transducer assembly comprises a sound transducer, wherein the sound transducer may comprise at least one of a microactuator, a coil, a magnet, a magnetostrictive element, a photostrictive element, or a piezoelectric element. In some embodiments of the invention, the input transducer assembly may comprise a light source coupled to sound processor by a fiber optic cable and positioned on a lateral ear canal assembly. In some embodiments of the invention, the input transducer assembly may comprise a laser diode coupled to a sound processor and positioned on the lateral ear canal assembly. In some embodiments of the invention, the light source of the input transducer assembly may be positioned in the ear canal along with a sound processor and a microphone. When properly coupled to the subject's hearing transduction pathway, the mechanical vibrations caused by the apparatus can stimulate the cochlea CO, which induces neural impulses in the subject which can be interpreted by the subject as a sound input.

In some embodiments, the platform material comprises the shape profile when in an unloaded configuration. In some embodiments, the elastomer comprises the shape profile when in an unloaded configuration. The apparatus is in an unloaded configuration when it is not coupled to the user (e.g., prior to insertion into the ear).

In some embodiments, the retention structure comprises a resilient retention structure, which will maintain the location of the actuator when coupled to the user. As a non-limiting example, the retention structure can maintain the actuator in proximity to the ear drum of the user. In certain embodiments, the retention structure maintains the actuator closer than 1 mm, closer than 2 mm, closer than 3 mm, closer than 4 mm, closer than 5 mm, closer than 6 mm, closer than 7 mm, closer than 8 mm, closer than 9 mm, closer than 10 mm, closer than 2 cm, or closer than 3 cm from the ear drum of the user. In certain embodiments, the structure can maintain the location of the actuator by the shape of the retention structure, as well as the composition of the layer of elastomer. In some embodiments, the elastomer can resist deflection away from the shape profile. In some embodiments, the retention structure can maintain the transducer in proximity to the tympanic membrane of the user.

In some embodiments, the user is a patient in need of a contact hearing apparatus. In some embodiments, the user is a mammal. In certain embodiments, the user is a human. In certain embodiments, the user is a patient suffering from hearing loss.

Figure 2:
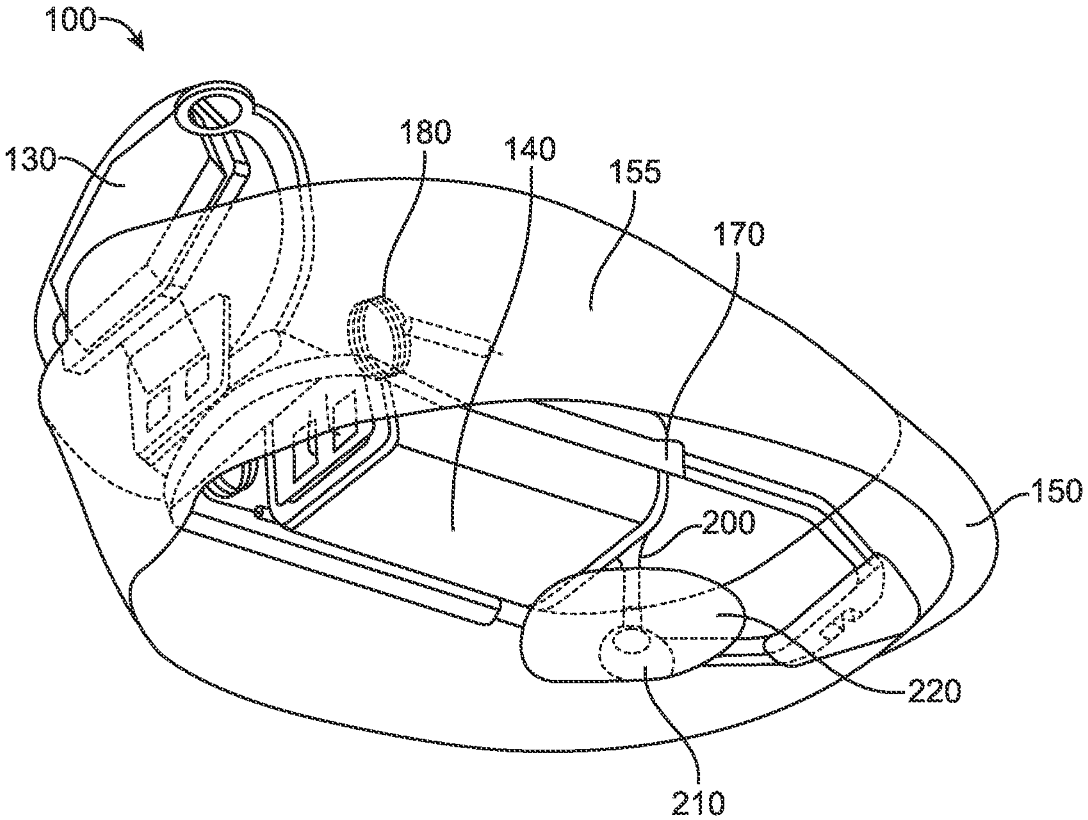
FIG. 2 is a bottom view of a contact hearing device according to the present invention.
Figure 3:
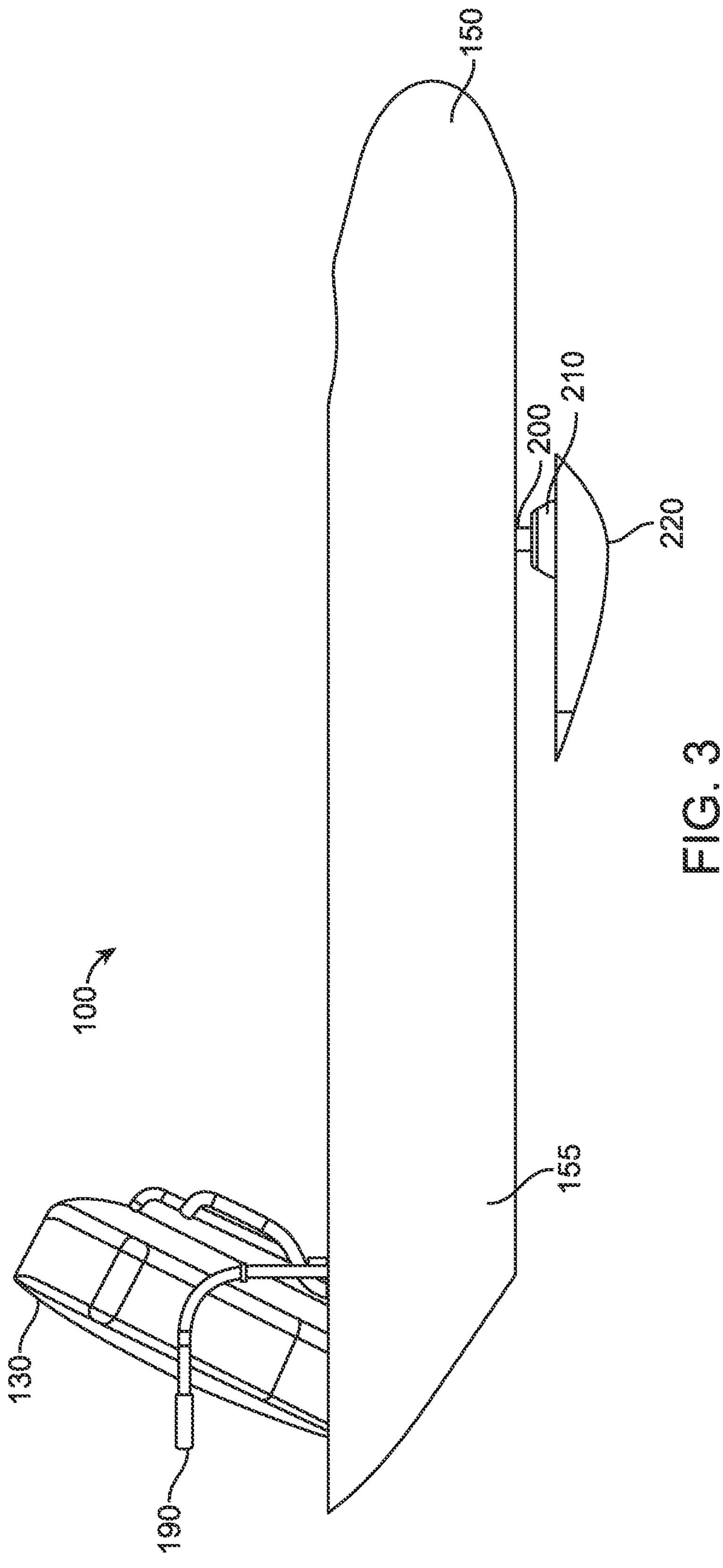
FIG. 3 is a side view of a contact hearing device according to the present invention.
Figure 4:
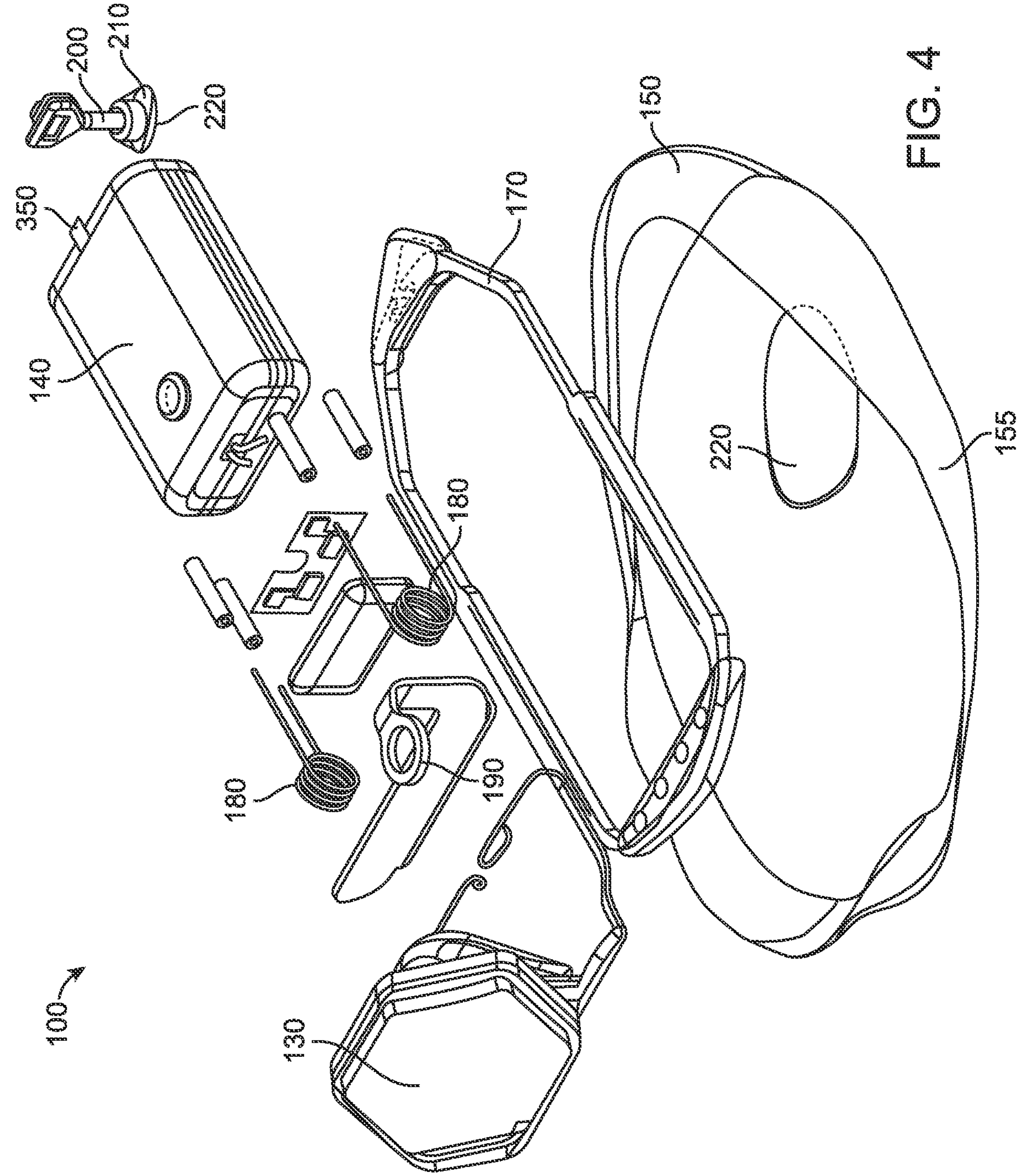
FIG. 4 is an exploded top view of a contact hearing device according to the present invention.

FIG. 1 is a top view of a contact hearing device 100 (which may also be referred to as a tympanic lens, output transducer assembly, or medial ear canal assembly) according to the present invention. FIG. 2 is a bottom view of a contact hearing device 100 according to the present invention. FIG. 3 is a side view of a contact hearing device 100 according to the present invention. FIG. 4 is an exploded top view of a contact hearing device 100 according to the present invention. In the contact hearing device of FIGS. 1, 2, 3, and 4, a perimeter platform 155 is mounted on a chassis 170. Perimeter platform 155 may include a sulcus platform 150 at one end of perimeter platform 155. Chassis 170 may further include bias springs 180 (which may also be referred to as torsion springs) mounted thereon and supporting transducer 140. Transducer 140 is connected to drive post 200, which is connected to umbo lens 240 by adhesive 210. Chassis 170 further supports grasping tab 190 and photodetector 130. In some embodiments of the invention, signals may be transmitted to contact hearing device 100 by, for example, magnetic coupling or radio frequency transmission. In some embodiments of the invention, element 130 may be a receiving coil or an antenna.

Figure 5:
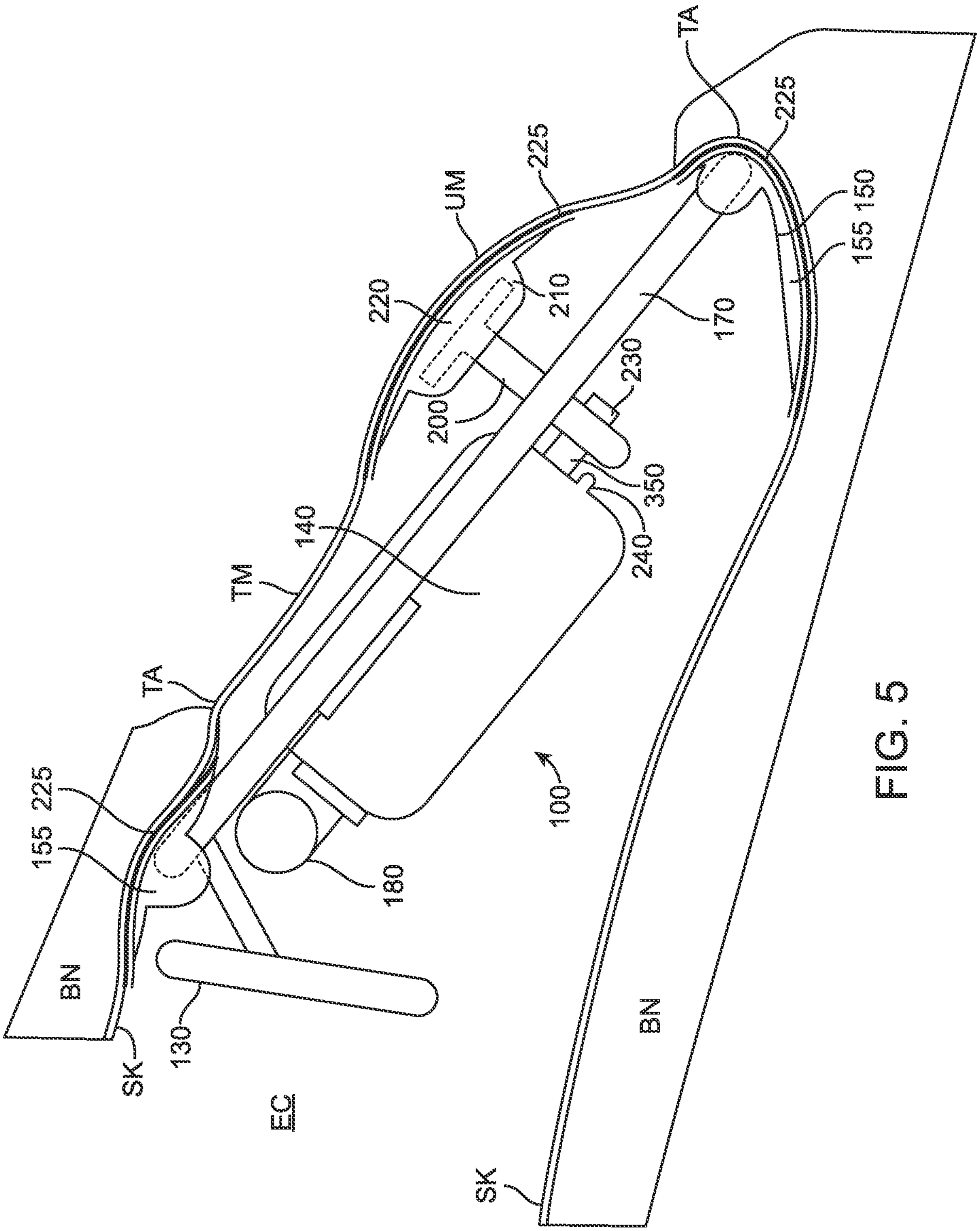
FIG. 5 is a side view of a contact hearing device according to the present invention with the contact hearing device positioned on the tympanic membrane of a user.

FIG. 5 is a further side view of a contact hearing device 100 according to the present invention where in contact hearing device 100 is positioned on the tympanic membrane TM of a user. In FIG. 5, contact hearing device 100 comprises perimeter platform 155 which includes sulcus platform 150 at one end thereof. Perimeter platform 155 is connected to chassis 170, which supports transducer 140 through bias springs 180. Transducer 140 includes transducer reed 350 extending from a distal end thereof. Transducer reed 350 is connected to umbo lens 220 through drive post 200. Chassis 170 further supports photodetector 130, which is electrically connected to transducer 140. In FIG. 5, perimeter platform 155 is positioned on skin SK covering the boney portion BN of the ear canal EC. The sulcus platform portion 150 of perimeter platform 155 is positioned at the medial end of the ear canal in the tympanic annulus TA. Umbo lens 200 is positioned on umbo UM of tympanic membrane TM. In FIG. 5, an oil layer 225, of, for example, mineral oil may be positioned between perimeter platform 155 and skin SK and between umbo lens 220 and umbo UM.

Figure 6:
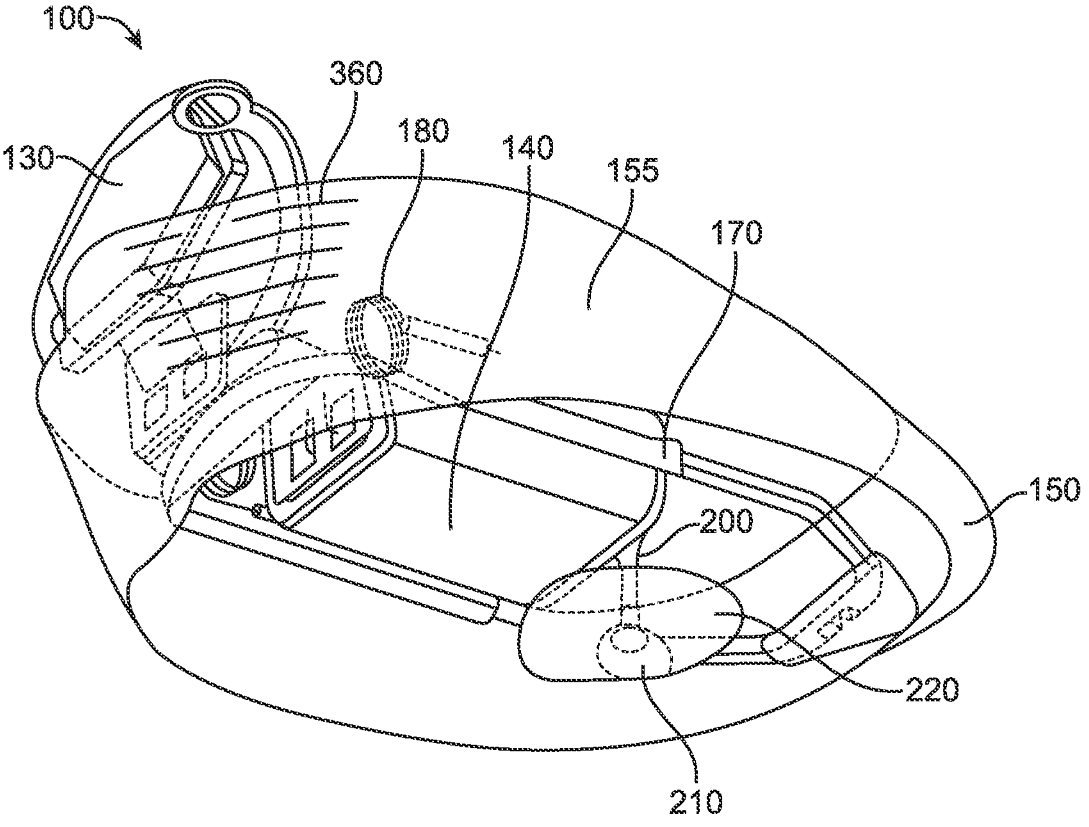
FIG. 6 is a bottom view of a contact hearing device including ridges according to the present invention.

FIG. 6 is a bottom view of a contact hearing device including ridges 360 according to the present invention. In some embodiments of the invention, the platform may retain 3D printing ridges 360, which may be, for example, used as a quality check to ensure that the platform conformed exactly to the mold. In some embodiments of the invention, the ridges may be formed when the elastomer comes into contact with the surface of the mold, where the mold is manufactured using three dimensional printing techniques. In some embodiments, the apparatus can comprise ridges along a tissue-facing surface. In certain embodiments, the apparatus comprises a elastomer comprising ridges along the tissue facing surface. In certain embodiments, the ridges are formed as a part of a three-dimensional (3D) printing process. In specific embodiments, the 3D printed component is a mold used to form the retention structure.

In order to resolve the issues described in the Background, it would be desirable to manufacture the retention platform out of a material that can recover its shape after deformation, such as the deformation experienced during delivery of a contact hearing device through an ear canal, while meeting all of the other requirements of a suitable platform material. In some embodiments, the platform material comprises a layer of elastomer. In certain embodiments, the platform material is a layer of elastomer. Elastomers represent a class of materials which can experience significant strain (often >50%) and recover their original shape once the deformation force has been relieved. In some embodiments of the invention, the use of elastomers in a retention platform for a contact hearing device may improve the stability of the contact hearing device in the ear canal. In some embodiments, the apparatus can comprise a layer of elastomer and additional layers of material. In certain embodiments, the apparatus can comprise a plurality of layers of elastomer.

In addition to the other requirements described herein, a suitable layer of elastomer according to the present invention would be a material which was optimized for one or more of the following characteristics: biocompatibility, dimensional stability, tensile modulus, surface structure and material thickness.

A suitable platform material would meet biocompatibility requirements which would ensure that it could be used in the ear of a user and, more particularly, could be placed in the ear canal of a user for an extended period of time without irritating or damaging the ear canal or components of the ear canal, including the tissue lining the ear canal. In some embodiments of the invention, suitable biocompatibility would include meeting requirements for measurements of cytotoxicity, sensitization and irritation. Such requirements may include requirements established by the International Organization for Standardization ("ISO"). In some embodiments of the invention, a suitable platform material would be expected to meet the cytotoxicity requirements of ISO 10993-5. In some embodiments of the invention, a suitable platform material would be expected to meet the sensitization requirements of ISO 10993-10. In some embodiments of the invention, a suitable platform material would be expected to meet the irritation requirements of ISO 10993-10. In some embodiments, the apparatus comprises a layer of elastomer that meets the cytotoxicity requirements of ISO 10993-5, the sensitization requirements of ISO 10993-10, and the irritation requirements of ISO-10993-10.

In some embodiments of the invention, a suitable elastomer would meet dimensional stability requirements which would ensure that key characteristics of the material would not change significantly when placed into an environment such as the ear canal of a user. In particular, the dimensional and stability requirements ensure that interaction between fluids found in the ear canal and the material would not change the key characteristics of the material in a way that detrimentally effects its performance when used in a contact hearing device, including, for example, as a sulcus or umbo platform material in a contact hearing device. Fluids which might be present in the ear canal include both physiological fluids, such as sweat or cerumen and externally introduced fluids such as mineral oil. In some embodiments of the invention, the dimensional stability of the material may be measured by comparing the raw material to material that has been soaked in a bath having a predetermined composition and measuring changes to the material after it is removed from the bath. In one embodiment of the invention, a suitable test bath may comprise a mixture of approximately 80% mineral oil, approximately 10% natural or artificial sweat and approximately 10% natural or artificial cerumen. In some embodiments of the invention, materials may be left in the test bath for a predetermined period of time. In some embodiments of the invention, materials may be left in the test bath for between sixteen (16) and thirty (30) days. In some embodiments of the invention, the test bath may be held at a predetermined temperature. In some embodiments of the invention, the test bath may be held at a temperature of between approximately 35 and approximately 39 degrees centigrade. In some embodiments of the invention, the test bath may be held at a temperature of approximately 37 degrees centigrade. The bath may separate into one or more phases since the mineral oil and cerumen phases may be immiscible with the artificial sweat phase. In some embodiments, the solution is stirred to form an emulsion. The stirring may be performed at various rates depending on the volume of the fluid test bath. In some embodiments, the stir rate is in the range from 0 to 1000 rpm, from 25 to 800 rpm, from 50 to 600 rpm, from 75 to 500 rpm, from 100 to 450 rpm, from 150 to 400 rpm, from 200 to 375 rpm, or from 250 to 350 rpm. In some embodiments, the stir rate is greater than 1 rpm, greater than 20 rpm, greater than 40 rpm, greater than 60 rpm, greater than 80 rpm, greater than 100 rpm, greater than 200 rpm, greater than 300 rpm, greater than 400 rpm, greater than 500 rpm, greater than 600 rpm, greater than 700 rpm, greater than 800 rpm, greater than 900 rpm, or greater than 1000 rpm.

Some of the key characteristics that might be expected to change when the layer of elastomer is placed into a test bath and/or into the ear canal of a user include changes to the dimensions of the platform resulting from, for example, the absorption of fluids from the ear canal. In some embodiments of the invention, such dimensional changes may include changes in the thickness of the materials, changes in the weight of the materials or changes in the tensile modulus of the materials. In certain embodiments, changes to the layer of elastomer are compared by exposing said material to a suitable test bath, comprising a mixture of approximately 80% mineral oil, approximately 10% natural or artificial sweat, and approximately 10% natural or artificial cerumen. In some embodiments, the layer of elastomer comprises material in the form of extruded tubing. The parameters (e.g., change in weight, thickness, or tensile modulus of the layer of elastomer) after said material has been left in the test bath for up to sixteen (16) days, the test bath being held at a temperature of approximately 37 degrees centigrade. The changes are compared against a reference layer of elastomer that is not subjected to the test bath.

In some embodiments of the invention, an apparatus comprising the layer of elastomer that is placed into a test bath and/or into the ear canal of a user can have a change in wall thickness. In some embodiments, the wall thickness changes would be approximately 0%. In some embodiments of the invention, wall thickness changes would be between approximately 0% and 0.5%, between approximately 0% and 1%, between approximately 0% and 2%, between approximately 0% and 3%, between approximately 0% and 4%, between approximately 0% and 5%, between approximately 0% and 6%, between approximately 0% and 7%, between approximately 0% and 8%, between approximately 0% and 9%, between approximately 0% and 10%, between approximately 0% and 15%, or between approximately 0% and 20%. In some embodiments of the invention, wall thickness changes would be less than 0.5%, less than 1%, less than 2%, less than 3%, less than 4%, less than 5%, less than 6%, less than 7%, less than 8%, less than 9%, less than 10%, less than 15%, or less than 20%.

In some embodiments of the invention, an apparatus comprising the layer of elastomer that is placed into a test bath and/or into the ear canal of a user can have a change in weight. In some embodiments of the invention, weight change is approximately 0% from the weight of a comparable apparatus that is not placed into a test bath and/or into the ear canal of a user. In some embodiments of the invention, weight change would be between approximately 0% and 0.5%, between approximately 0% and 1%, between approximately 0% and 2%, between approximately 0% and 3%, between approximately 0% and 4%, between approximately 0% and 5%, between approximately 0% and 6%, between approximately 0% and 7%, between approximately 0% and 8%, between approximately 0% and 9%, between approximately 0% and 10%, between approximately 0% and 11%, between approximately 0% and 12%, between approximately 0% and 13%, between approximately 0% and 14%, between approximately 0% and 15%, between approximately 0% and 20%, or between approximately 0% and 25%. In some embodiments of the invention, weight changes would be less than 0.5%, less than 1%, less than 2%, less than 3%, less than 4%, less than 5%, less than 6%, less than 7%, less than 8%, less than 9%, less than 10%, less than 11%, less than 12%, less than 13%, less than 14%, less than 15%, or less than 20% when compared to the apparatus that is not placed into a test bath and/or into the ear canal of a user.

In some embodiments of the invention, an apparatus comprising the layer of elastomer that is placed into a test bath and/or into the ear canal of a user can have changes to the tensile modulus (also referred to herein as Young's modulus) of the elastomer. In some embodiments of the invention, the change in tensile modulus would be approximately 0%. In some embodiments of the invention, changes to the tensile modulus would be between approximately 0% and 0.5%, between approximately 0% and 1%, between approximately 0% and 2%, between approximately 0% and 3%, between approximately 0% and 4%, between approximately 0% and 5%, between approximately 0% and 6%, between approximately 0% and 7%, between approximately 0% and 8%, between approximately 0% and 9%, between approximately 0% and 10%, between approximately 0% and 15%, between approximately 0% and 20%, between approximately 0% and 25%, between approximately 0% and 30%, between approximately 0% and 35%, between approximately 0% and 40%, between approximately 0% and 45%, or between approximately 0% and 50%. In some embodiments of the invention, the change in tensile modulus would be less than 0.5%, less than 1%, less than 2%, less than 3%, less than 4%, less than 5%, less than 6%, less than 7%, less than 8%, less than 9%, less than 10%, less than 11%, less than 12%, less than 13%, less than 14%, less than 15%, less than 20%, less than 25%, less than 30%, less than 35%, less than 40%, less than 45%, or less than 50%. The Young's modulus can be determined, for example, by measuring the tangent value in the change of strain for a range in stress, or by dividing tensile stress by extensional strain in the elastic portion of a stress-strain curve.

In some embodiments of the invention, an apparatus comprising the layer of elastomer that is placed into a water bath can have a change in wall thickness. In some embodiments, the wall thickness changes would be approximately 0%. In some embodiments of the invention, wall thickness changes would be between approximately 0% and 0.5%, between approximately 0% and 1%, between approximately 0% and 2%, between approximately 0% and 3%, between approximately 0% and 4%, between approximately 0% and 5%, between approximately 0% and 6%, between approximately 0% and 7%, between approximately 0% and 8%, between approximately 0% and 9%, between approximately 0% and 10%, between approximately 0% and 15%, or between approximately 0% and 20%. In some embodiments of the invention, wall thickness changes would be less than 0.5%, less than 1%, less than 2%, less than 3%, less than 4%, less than 5%, less than 6%, less than 7%, less than 8%, less than 9%, less than 10%, less than 15%, or less than 20%.

In some embodiments of the invention, an apparatus comprising the layer of elastomer that is placed into a water bath can have a change in weight. In some embodiments of the invention, weight change is approximately 0% from the weight of a comparable apparatus that is not placed into a water bath. In some embodiments of the invention, weight change would be between approximately 0% and 0.5%, between approximately 0% and 1%, between approximately 0% and 2%, between approximately 0% and 3%, between approximately 0% and 4%, between approximately 0% and 5%, between approximately 0% and 6%, between approximately 0% and 7%, between approximately 0% and 8%, between approximately 0% and 9%, between approximately 0% and 10%, between approximately 0% and 11%, between approximately 0% and 12%, between approximately 0% and 13%, between approximately 0% and 14%, between approximately 0% and 15%, between approximately 0% and 20%, or between approximately 0% and 25%. In some embodiments of the invention, weight changes would be less than 0.5%, less than 1%, less than 2%, less than 3%, less than 4%, less than 5%, less than 6%, less than 7%, less than 8%, less than 9%, less than 10%, less than 11%, less than 12%, less than 13%, less than 14%, less than 15%, or less than 20% when compared to the apparatus that is not placed into a water bath.

In some embodiments of the invention, an apparatus comprising the layer of elastomer that is placed into a water bath can have changes to the tensile modulus (also referred to herein as Young's modulus) of the elastomer. In some embodiments of the invention, the change in tensile modulus would be approximately 0%. In some embodiments of the invention, changes to the tensile modulus would be between approximately 0% and between approximately 0% and 1%, between approximately 0% and 2%, between approximately 0% and 3%, between approximately 0% and 4%, between approximately 0% and 5%, between approximately 0% and 6%, between approximately 0% and 7%, between approximately 0% and 8%, between approximately 0% and 9%, between approximately 0% and 10%, between approximately 0% and 15%, between approximately 0% and 20%, between approximately 0% and 25%, between approximately 0% and 30%, between approximately 0% and 35%, between approximately 0% and 40%, between approximately 0% and 45%, or between approximately 0% and 50%. In some embodiments of the invention, the change in tensile modulus would be less than 0.5%, less than 1%, less than 2%, less than 3%, less than 4%, less than 5%, less than 6%, less than 7%, less than 8%, less than 9%, less than 10%, less than 11%, less than 12%, less than 13%, less than 14%, less than 15%, less than 20%, less than 25%, less than 30%, less than 35%, less than 40%, less than 45%, less than 50%, less than 55%, less than 60%, less than 65%, less than 70%, or less than 75% following exposure to a test bath for 16 days at 37° C., wherein the test bath comprises 10 wt % Synthetic Cerumen, 10 wt % EN1811 Sweat, and 80 wt % mineral oil. The Young's modulus can be determined, for example, by measuring the tangent value in the change of strain for a range in stress, or by dividing tensile stress by extensional strain in the elastic portion of a stress-strain curve.

In some embodiments of the invention, the elastomer has a Young's modulus of between 0.1 MPa and 5.0 MPa, between 0.2 MPa and 4.8 MPa, between 0.3 MPa and 4.6 MPa, between 0.4 MPa and 4.3 MPa, between 0.5 MPa and 4.0 MPa, between 0.6 MPa and 3.9 MPa, between 0.7 MPa and 3.8 MPa, between 0.8 MPa and 3.7 MPa, between 0.9 MPa and 3.6 MPa, or between 1.0 MPa and 3.5 MPa. In certain embodiments of the invention, the elastomer has a Young's modulus between 0.6 MPa and 3.6 MPa. In some embodiments of the invention, the elastomer has a Young's modulus of between 1 MPa and 100 MPa, between 2 MPa and 90 MPa, between 3 MPa and 80 MPa, between 4 MPa and 70 MPa, between 5 MPa and 60 MPa, between 0.5 MPa and 50 MPa, between 1 MPa and 50 MPa, between 10 MPa and 50 MPa, between 20 MPa and 50 MPa, between 30 MPa and 50 MPa, between 40 MPa and 50 MPa, between 1 MPa and 40 MPa, between 10 MPa and 40 MPa, between 20 MPa and 40 MPa, between 30 MPa and 40 MPa, between 1 MPa and 30 MPa, between 10 MPa and 30 MPa, between 20 MPa and 30 MPa, between 1 MPa and 20 MPa, between 10 MPa and 20 MPa, or between 1 MPa and 10 MPa. In certain embodiments of the invention, the elastomer has a Young's modulus of between 5 MPa and 50 MPa. In some embodiments of the invention, the elastomer has a Young's modulus of less than 75 MPa, less than 70 Mpa, less than 65 MPa, less than 60 MPa, less than 55 MPa, less than 50 MPa, less than 45 MPa, less than 40 MPa, less than 35 MPa, less than 30 MPa, less than 25 MPa, less than 20 MPa, less than 15 MPa, less than 10 MPa, or less than 5 MPa.

In some embodiments of the invention, a suitable elastomer would meet temperature stability requirements which would ensure that key characteristics of the material would not change significantly when placed into an environment such as the ear canal of a user. In some embodiments, the elastomer is insensitive to temperatures at or near the temperature of a human ear canal. In certain embodiments, sensitivity to temperature is measured as an assessment of degradation (e.g., by microscopic analysis) following prolonged exposure (e.g., 1 month) to a temperature parameter. In some embodiments, sensitivity to temperature is determined by a change in geometric configuration, as confirmed by optical visualization, such as by scanning microscopy. In some embodiments, a elastomer is deemed insensitive to temperature following prolonged exposure if the layer of elastomer has less than 20% change in shape, less than 19% change in shape, less than 18% change in shape, less than 17% change in shape, less than 16% change in shape, less than 15% change in shape, less than 14% change in shape, less than 13% change in shape, less than 12% change in shape, less than 11% change in shape, less than 10% change in shape, less than 9% change in shape, less than 8% change in shape, less than 7% change in shape, less than 6% change in shape, less than 5% change in shape, less than 4% change in shape, less than 3% change in shape, less than 2% change in shape, less than 1% change in shape, less than 0.9% change in shape, less than 0.8% change in shape, less than 0.7% change in shape, less than 0.6% change in shape, less than 0.6% change in shape, less than 0.5% change in shape, less than 0.4% change in shape, less than 0.3% change in shape, less than 0.2% change in shape, or less than 0.1% change in shape. In some embodiments, the change in shape is measured by comparing (for example, by digitally overlaying) the platform shape before and after prolonged exposure to the temperature parameter. In some embodiments, the elastomer is insensitive to temperatures from 0° C. to 60° C., from 5° C. to 55° C., from 10° C. to 50° C., from 15° C. to 45° C., from 20° C. to 40° C., or from 25° C. to 40° C. In some embodiments, the elastomer is insensitive to temperatures from 0° C. to 100° C., from 0° C. to 90° C., from 0° C. to 80° C., from 0° C. to 70° C., from 0° C. to 60° C., from 0° C. to 55° C., from 0° C. to 50° C., from 0° C. to 45° C., or from 0° C. to 40° C. In some embodiments, the elastomer is insensitive to temperatures from 15° C. to 45° C.

In some embodiments of the invention, the suitable layer of elastomer does not display wrinkling or buckling. Wrinkling or buckling can be determined by visual inspection. In some embodiments, the visual inspection comprises optical assistance, such as by use of a microscope or scanning microscopy.

In some embodiments, the suitable layer of elastomer is resistant to tearing on insertion and/or removal from the ear canal. In some embodiments, the suitable layer of elastomer is resistant to tearing or shape deformation during manufacture and/or clinical handling.

In some embodiments, the suitable platform material is hydrophobic. In some embodiments, the suitable platform material is hydrophilic. In certain embodiments, the suitable platform material is hydrophobic and hydrophilic (e.g., having hydrophobic regions and hydrophilic regions). In some embodiments, the suitable layer of elastomer is hydrophobic. In some embodiments, the suitable layer of elastomer is hydrophilic. In certain embodiments, the suitable layer of elastomer is hydrophobic and hydrophilic (e.g., having hydrophobic regions and hydrophilic regions). In certain embodiments, the material allows epithelial cells to pass under the perimeter platform during the natural migration of the epithelial layer, which can avoid epithelial build-up.

In some embodiments, the suitable elastomer is lipophilic. In some embodiments, the suitable elastomer is lipophobic. In some embodiments, the suitable elastomer is lipophobic and lipophilic (e.g., having lipophilic regions and lipophobic regions). In certain embodiments, the elastomer can absorb and retain mineral oil. The measurement of mineral oil absorption can be measured by the swelling of the elastomer following exposure to said mineral oil. For example, an increase of mass of an elastomer exposed to mineral oil can indicate the elastomer is swelling with mineral oil absorption. In some embodiments, the layer of elastomer mass increases by greater than 1%, greater than 2%, greater than 3%, greater than 4%, greater than 5%, greater than 6%, greater than 7%, greater than 8%, greater than 9%, greater than 10%, greater than 15%, greater than 20%, or greater than 25% following exposure of the elastomer to mineral oil. In some embodiments, the mass of the apparatus increases by greater than 1%, greater than 2%, greater than 3%, greater than 4%, greater than 5%, greater than 6%, greater than 7%, greater than 8%, greater than 9%, greater than 10%, greater than 15%, greater than 20%, or greater than 25% following exposure of the layer of elastomer to mineral oil. In some embodiments, the apparatus can elute mineral oil.

In some embodiments of the invention, the suitable layer of elastomer comprises an elastomer with an ultimate tensile strength modulus measured at an elongation of approximately 650%. In some embodiments of the invention, a suitable elastomer would have an ultimate tensile strength modulus of between approximately 1 MegaPascal (MPa) and approximately 300 MPa at an elongation of approximately 650%. In some embodiments of the invention, a suitable elastomer would have an ultimate tensile strength modulus of between 20 MPa and 100 MPa at an elongation of approximately 650%. In some embodiments of the invention, the suitable elastomer has an ultimate tensile strength modulus of between 40 MPa and 60 MPa at an elongation of approximately 650%. In some embodiments of the invention, the suitable layer has an ultimate tensile strength modulus of from 1 MPa to 500 MPa, from 5 MPa to 400 MPa, from 10 MPa to 300 MPa, from 15 MPa to 200 MPa, from 20 MPa to 150 MPa, from 25 MPa to 100 MPa, from 30 MPa to 75 MPa, from 35 MPa to 70 MPa, or from 40 MPa to 60 MPa at an elongation of approximately 650%. In some embodiments of the invention, the suitable elastomer has an ultimate tensile strength modulus of from 1 MPa to 200 MPa, from 5 MPa to 150 MPa, from 10 MPa to 100 MPa, from 15 MPa to 90 MPa, from 20 MPa to 80 MPa, from 25 MPa to 70 MPa, or from 30 MPa to 60 MPa at an elongation of approximately 650%. In some embodiments of the invention, the suitable elastomer has an ultimate tensile strength modulus less than 200 MPa, less than 150 MPa, less than 100 MPa, less than 90 MPa, less than 80 MPa, less than 70 MPa, less than 60 MPa, less than 50 MPa, or less than 40 MPa at an elongation of approximately 650%.

In some embodiments of the invention, a suitable elastomer would have optimal elasticity, including an optimal tensile stress. In some embodiments, the elastomer has a tensile stress of between 1.0 MPa and 5.0 MPa, between 1.1 MPa and 4.9 MPa, between 1.2 MPa and 4.8 MPa, between 1.3 MPa and 4.7 MPa, between 1.4 MPa and 4.6 MPa, between 1.5 MPa and 4.5 MPa, between 1.6 MPa and 4.4 MPa, between 1.7 MPa and 4.3 MPa, between 1.8 MPa and 4.2 MPa, between 1.9 MPa and 4.1 MPa, or between 2.0 MPa and 4.0 MPa at 50% elongation. In some embodiments, the suitable elastomer has a tensile stress of between 0.1 MPa and 10 MPa, between 0.2 MPa and 9 MPa, between 0.3 MPa and 8 MPa, between 0.4 MPa and 7 MPa, or between 0.5 MPa and 6 MPa at 50% elongation. In some embodiments, the suitable elastomer has a tensile stress of between approximately 2.0 MPa and approximately 4.0 MPa at 50% elongation. In some embodiments of the invention, a suitable elastomer would have a tensile stress of between approximately 2.4 MPa and approximately 4.2 MPa at 50% elongation.

In some embodiments of the invention, a suitable elastomer has a tensile stress of between 0.1 MPa and 10 MPa, between 0.5 MPa and 9 MPa, between 0.7 MPa 8 MPa, between 1.0 MPa and 7.0 MPa, between 1.1 MPa and 6.9 MPa, between 1.2 MPa and 6.8 MPa, between 1.3 MPa and 6.7 MPa, between 1.4 MPa and 6.6 MPa, between 1.5 MPa and 6.5 MPa, between 1.6 MPa and 6.4 MPa, between 1.7 MPa and 6.3 MPa, between 1.8 MPa and 6.2 MPa, between 1.9 MPa and 6.1 MPa, between 2.0 MPa and 6.0 MPa, between 2.1 MPa and 5.9 MPa, between 2.2 MPa and 5.8 MPa, between 2.3 MPa and 5.7 MPa, between 2.4 MPa and 5.6 MPa, between 2.5 MPa and 5.5 MPa, between 2.6 MPa and 5.4 MPa, between 2.7 MPa and 5.3 MPa, between 2.8 MPa and 5.2 MPa, between 2.9 MPa and 5.1 MPa, or between 3.0 MPa and 5.0 MPa at 100% elongation. In some embodiments of the invention, a suitable elastomer has a tensile stress of between 3.0 MPa and 5.0 MPa at 100% elongation. In some embodiments of the invention, a suitable elastomer would have a tensile stress of between approximately 3.4 MPa and approximately 5.5 MPa at 100% elongation.

In some embodiments, the suitable layer of elastomer has a thickness of less than 500 microns, less than 450 microns, less than 400 microns, less than 350 microns, less than 300 microns, less than 250 microns, less than 200 microns, less than 175 microns, less than 150 microns, less than 125 microns, less than 100 microns, less than 90 microns, less than 80 microns, less than 70 microns, less than 60 microns, or less than 50 microns. In some embodiments, the suitable layer of elastomer has a thickness of between 1 micron and 500 microns, between 5 microns and 500 microns, between 10 microns and 500 microns, between microns and 500 microns, between 20 microns and 500 microns, between 25 microns and 500 microns, between 50 microns and 500 microns, between 75 microns and 500 microns, between 100 microns and 500 microns, between 150 microns and 500 microns, between 200 microns and 500 microns, between 250 microns and 500 microns, or between 300 microns and 500 microns. In some embodiments of the invention, a suitable layer of elastomer would have a thickness of between approximately 25 microns and approximately 500 microns. In some embodiments of the invention, a suitable layer of elastomer would have a thickness of between approximately 75 microns and approximately 500 microns.

In some embodiments, the suitable umbo platform material has a thickness of between 1 micron and 500 microns, between 5 microns and 400 microns, between 10 microns and 300 microns, between 15 microns and 200 microns, between 20 microns and 150 microns, between 25 microns and 100 microns, between 30 microns and 90 microns, between 40 microns and 80 microns, or between 50 microns and 70 microns. In some embodiments, the umbo platform material has a thickness of less than 200 microns, less than 190 microns, less than 180 microns, less than 170 microns, less than 160 microns, less than 150 microns, less than 140 microns, less than 130 microns, less than 120 microns, less than 110 microns, less than 100 microns, less than 90 microns, less than 80 microns, less than 70 microns, less than microns, or less than 50 microns. In some embodiments of the invention, the suitable umbo platform material would have a thickness of between approximately 25 microns and approximately 100 microns. In some embodiments, the umbo platform material comprises a layer of elastomer. In some embodiments, the umbo platform material is a layer of elastomer.

In some embodiments of the invention, a suitable layer of elastomer would have surface characteristics which are optimized for use in a direct drive device according to the present invention. In some embodiments of the invention, an appropriate material would have surface characteristics including surface energy and surface roughness. In some embodiments, the suitable layer of elastomer has a surface air-water contact angle of between degrees and 150 degrees, 85 degrees and 145 degrees, 90 degrees and 140 degrees, 95 degrees and 135 degrees, 100 degrees and 130 degrees, 101 degrees and 129 degrees, 102 degrees and 128 degrees, 103 degrees and 127 degrees, 104 degrees and 126 degrees, 105 degrees and 125 degrees, 106 degrees and 124 degrees, 107 degrees and 123 degrees, 108 degrees and 122 degrees, 109 degrees and 121 degrees, 110 degrees and 120 degrees, 119 degrees and 121 degrees, 118 degrees and 122 degrees, 117 degrees and 123 degrees, 116 degrees and 124 degrees, 115 degrees and 125 degrees, 114 degrees and 126 degrees, 113 degrees and 127 degrees, 112 degrees and 128 degrees, 111 degrees and 129 degrees, or 110 degrees and 130 degrees. In some embodiments of the invention, a suitable layer of elastomer would have a surface air-water contact angle of between approximately 100 degrees and 130 degrees. In some embodiments of the invention, a suitable layer of elastomer would have a surface air-water contact angle of approximately 110, 111, 112, 113, 114, 115, 116, 117, 118, 119, 120, 121, 122, 123, 124, 125, 126, 127, 128, 129, or 130 degrees. In certain embodiments, the suitable layer of elastomer has a surface air-water contact angle of approximately 120 degrees. In some embodiments of the invention, the suitable layer of elastomer has a surface air-to-water contact angle of between 20 degrees and 80 degrees, 25 degrees and 75 degrees, 30 degrees and 70 degrees, 35 degrees and 65 degrees, or 40 degrees and 60 degrees. In some embodiments, the layer of elastomer has a surface air-to-water contact angle of less than 80 degrees, less than 75 degrees, less than 70 degrees, less than 65 degrees, less than 60 degrees, less than 55 degrees, less than 50 degrees, less than 45 degrees, less than 40 degrees, less than 35 degrees, or less than 30 degrees.

In some embodiments of the invention, a suitable platform material would include 3D printing features. In some embodiments of the invention, a suitable platform material would include 3D printing features having a depth of approximately 25 microns. In some embodiments of the invention, a suitable platform material would include a layer of elastomer having 3D printing features having a depth of approximately 25 microns. In some embodiments, the platform material comprises a layer of elastomer. In some embodiments of the invention, the tissue facing surface of a suitable platform material would include lines space at a predetermined distance apart. In some embodiments of the invention, a suitable platform material would include lines space approximately 25 microns apart. In some embodiments of the invention, the lines may result from print lines in the ear canal mold that is used to form the sulcus platform. In some embodiments of the invention, the presence of the lines may be used as an indicator that the sulcus platform was properly and uniformly deposited on the mold to accurately take the shape of the anatomy of the patient reflected in the mold. In certain embodiments, the suitable platform material comprises a layer of elastomer. In some embodiments, the suitable platform material is a layer of elastomer.

In some embodiments of the invention, a suitable platform material comprises a hardness rating measured on the Shore A hardness scale. In certain embodiments, the platform material has a hardness rating between 75 and 90 on the Shore A hardness scale. In some embodiments, the platform material has a hardness rating between 80 and 85, between 75 and 90, between 70 and 95, or between 65 and 100 on the Shore A hardness scale. In certain embodiments, the platform material comprises a layer of elastomer having a hardness rating between 75 and 90 on the Shore A hardness scale. In some embodiments, the elastomer has a hardness rating between 80 and 85, between 75 and 90, between 70 and 95, or between 65 and 100 on the Shore A hardness scale. In certain embodiments, the elastomer has a hardness rating between 0 and 100, between 10 and 100, between 20 and 100, between 30 and 100, between 40 and 100, between 50 and 100, between 60 and 100, between 70 and 100, or between 80 and 100 on the Shore A hardness scale. In some embodiments of the invention, a suitable layer of elastomer may comprise, for example, a polycarbonate-based silicone elastomer (e.g., a ChronoSil®). In some embodiments of the invention a suitable layer of elastomer may comprise, for example, an aliphatic polycarbonate-based thermoplastic urethane (e.g., ChronoFlex® AL) having a hardness rating of between approximately 75 and approximately 90 on the Shore A hardness scale.

In some embodiments of the invention, the layer of elastomer would include polydimethylsiloxane. In some embodiments, the layer of elastomer comprises from 0.1% to 25%, from 1% to 24%, from 2% to 23%, from 3% to 22%, from 4% to 21%, from 5% to 20%, from 6% to 19%, from 7% to 18%, from 8% to 17%, from 9% to 16%, from 10% to 15%, from 9% to 11%, from 8% to 12%, from 7% to 13%, from 6% to 14%, from 5% to 15%, from 1% to 2%, from 1% to 3%, from 1% to 4%, from 1% to 5%, from 1% to 6%, from 1% to 7%, from 1% to 8%, from 1% to 9%, from 1% to 10%, from 1% to 11%, from 1% to 12%, from 1% to 13%, from 1% to 14%, from 1% to 15%, from 1% to 16%, from 1% to 17%, from 1% to 18%, from 1% to 19%, or from 1% to 20% polydimethylsiloxane by weight. In some embodiments, the layer of elastomer comprises between approximately 5% and approximately 15% polydimethylsiloxane by weight. In some embodiments, the layer of elastomer comprises approximately 10% polydimethylsiloxane by weight.

In some embodiments of the invention, elastomers which have shown durability and possess elasticity making them suitable for use in a perimeter platform include polyurethanes, such as ChronoSil® (from AdvanSource Biomaterials) and BioNate® (from DSM). In some embodiments of the invention, elastomers which have shown durability and possess elasticity making them suitable for use in a perimeter platform include fluoropolymers such as polytetrafluoroethylene-co-hexafluoropropylene-co-vinylidene fluoride (from THV and THVP, 3M). In some embodiments of the invention, suitable platform materials may also include a thermoplastic elastomer comprising polyamide and polyether (e.g., Pebax® 7433 from Arkema). In some embodiments of the invention, suitable platform materials may also include polycarbonate urethane with poly(dimethyl siloxane) soft segment. In some embodiments of the invention, suitable platform materials may include polycarbonate urethane-co-poly(dimethyl siloxane).

In some embodiments, the platform material comprises a layer of elastomer. In some embodiments, the elastomer can comprise a styrenic block copolymer (SBC), a silicone rubber, an elastomeric alloy, a thermoplastic, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or any combination thereof (e.g., a blend of at least two of the listed materials). In some embodiments, the elastomer can comprise a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, or any combination thereof. In some embodiments, the layer of elastomer comprises a blend, a layered material, or a combination thereof. In some embodiments, the layer of elastomer can comprise a blend of the above-disclosed elastomers, a combination of the above-disclosed elastomers, a plurality of layers comprising the above-disclosed elastomers, or any combination thereof.

In some embodiments, the elastomer can comprise a polyurethane, a polycarbonate urethane with a silicone rubber soft segment, a polycarbonate urethane, an aromatic polyurethane, a fluoropolymer, a polyetherurethane, a nylon, a polyetherblockamide, an aliphatic polyetherurethane, a polyetherurethane, a propylene, a propylene with rubber, or any combination thereof. In some embodiments, the platform material can comprise a layer of elastomer, the elastomer comprising a polyurethane (e.g., a ChronoSil®), a fluoropolymer, THV [poly(tetrafluoroethylene-co-hexafluoropropylene-co-vinylidene fluoride)], a polycarbonate urethane with poly(dimethylsiloxane) soft segment, a polycarbonate urethane-co-poly(dimethyl siloxane), any derivative thereof, or any combination thereof. In certain embodiments, the elastomer can comprise ChronoSil® 75A, Chronosil® 55D, Chronosil® 75D, Chronosil® 45D, THV 221GZ, BioNate 80A, BioNate II 80A, THVP 2030, Pebax 7233, Pebax 7433, Elastollan 85A, Elastollan 95A, THV AZ, Santoprene, Estane 58300, any derivative thereof, or any combination thereof. In some embodiments, the elastomer can comprise a silicone rubber, a polydimethylsiloxane (PDMS), a polycarbonate urethane, a polyether urethane variotherm, a polyether urethane urea, a polyurethane poly (dimethoylsiloxane), a nitinol, Carbo 3D EPU 60, Visijet M2ENT, a poly(p-xylylene) polymer (e.g., a Parylene™), any derivative thereof, or any combination thereof. In some embodiments, the platform material comprises a blend, a layered material, or a combination thereof. In some embodiments, the platform material can comprise a blend of the above-disclosed elastomers, a combination of the above-disclosed elastomers, a plurality of layers comprising the above-disclosed elastomers, or any combination thereof.

In some embodiments, the layer of elastomer is coated with a coating polymer. The coating polymer can, for example, provide additional stiffness to the apparatus. In some embodiments, the coating polymer can provide additional features to the structure, such as increasing comfort for the user, providing increased absorption of mineral oil, or preventing deformation of the apparatus. In some embodiments, the coating polymer comprises aromatic hydrocarbon monomers. In certain embodiments, the coating polymer comprises a poly(p-xylylene) polymer (e.g., a Parylene™) or any derivative thereof. In some embodiments, the retention structure comprises the layer of elastomer coated with a coating polymer. The coating polymer can completely surround the retention structure, or can surround a portion of the retention structure. In certain embodiments, the coating polymer can surround greater than 10% of the retention structure surface area, greater than 20% of the retention structure surface area, greater than 30% of the retention structure surface area, greater than 40% of the retention structure surface area, greater than 50% of the retention structure surface area, greater than 60% of the retention structure surface area, greater than 70% of the retention structure surface area, greater than 75% of the retention structure surface area, greater than 80% of the retention structure surface area, greater than 85% of the retention structure surface area, greater than 90% of the retention structure surface area, greater than 91% of the retention structure surface area, greater than 92% of the retention structure surface area, greater than 93% of the retention structure surface area, greater than 94% of the retention structure surface area, greater than 95% of the retention structure surface area, greater than 96% of the retention structure surface area, greater than 97% of the retention structure surface area, greater than 98% of the retention structure surface area, or greater than 99% of the retention structure surface area. In certain embodiments, the coating polymer can surround greater than 10% of the layer of elastomer surface area, greater than 20% of the layer of elastomer surface area, greater than 30% of the layer of elastomer surface area, greater than 40% of the layer of elastomer surface area, greater than 50% of the layer of elastomer surface area, greater than 60% of the layer of elastomer surface area, greater than 70% of the layer of elastomer surface area, greater than 75% of the layer of elastomer surface area, greater than 80% of the layer of elastomer surface area, greater than 85% of the layer of elastomer surface area, greater than 90% of the layer of elastomer surface area, greater than 91% of the layer of elastomer surface area, greater than 92% of the layer of elastomer surface area, greater than 93% of the layer of elastomer surface area, greater than 94% of the layer of elastomer surface area, greater than 95% of the layer of elastomer surface area, greater than 96% of the layer of elastomer surface area, greater than 97% of the layer of elastomer surface area, greater than 98% of the layer of elastomer surface area, or greater than 99% of the layer of elastomer surface area.

In some embodiments of the invention, the perimeter platform may be made out of a material which can recover its intended geometry almost completely following delivery and placement. In some embodiments of the invention elastomers represent a class of materials which may address these issues.

In some embodiments of the invention, standard manufacturing methods may be used to manufacture perimeter platforms and umbo platforms using materials described herein. In some embodiments of the invention, the perimeter platform may be manufactured using a variety of methods, including vacuum forming, dip coating, thermoforming, injection molding, or blow molding. In some embodiments of the invention, in the case of blow molding, because the specific geometry of each perimeter platform is unique to an individual subject, the mold must also have a unique geometry. In some embodiments of the invention, a suitable method for preparing such a mold is by 3D printing.

In some embodiments of the invention, the term platform material may be used to refer to the perimeter platform, the sulcus platform, the retention structure, and/or the umbo platform.

In some embodiments of the invention, the perimeter platform may have a variable wall thickness, ranging between approximately 175 microns in a first region of the perimeter platform and approximately 400 microns in a second portion of the perimeter platform. In some embodiments of the invention, the umbo platform may have variable wall thicknesses, ranging from approximately 50 microns in a first region of the umbo platform to approximately 150 microns in a second region of the umbo platform.

In some embodiments of the invention, the perimeter platform may have a weight of approximately 20 milligrams. In some embodiments of the invention, the perimeter platform may have a weight in the range of between approximately 5 milligrams to approximately 20 milligrams. In some embodiments of the invention, the umbo platform may have a weight of approximately 1 milligram. In some embodiments of the invention, the umbo platform may have a weight of between approximately 1 milligram and approximately 2 milligrams.

In some embodiments of the invention, the perimeter platform and umbo platform may be coated in oil, such as, for example, mineral oil. In some embodiments, the platform material can be coated with a coating having properties similar to mineral oil. In certain embodiments, the platform material can be bonded to a coating having properties similar to mineral oil. In some embodiments, the layer of elastomer can be coated with a coating having properties similar to mineral oil. In certain embodiments, the layer of elastomer can be bonded to a coating having properties similar to mineral oil. In some embodiments, the retention structure can be coated with a coating having properties similar to mineral oil. In certain embodiments, the retention structure can be bonded to a coating having properties similar to mineral oil. In some embodiments, the similarities between the coating and the mineral oil comprise lipophilicity and/or hydrophobicity.

Methods of Using the Apparatus

In some embodiments of the invention, an apparatus as described herein can be used to provide treatment to a user in need. A method of treating a user in need of a hearing device can comprise: (i) providing the user with the apparatus as described herein; and (ii) inserting the apparatus into an ear of the user, such that a transducer on the apparatus is in proximity to the eardrum of the user. In some embodiments, the method further comprises the step of administering mineral oil to the apparatus, to the ear of the user, or any combination thereof.

Kits Comprising the Apparatus

In some embodiments of the invention, a kit comprising an apparatus as described herein is disclosed. A kit can comprise: (i) the apparatus as described herein; and (ii) instructions for using the apparatus. In some embodiments, the kit further comprises mineral oil.

Methods of Manufacturing the Apparatus

In some embodiments of the invention, a method of manufacturing an apparatus as described herein is disclosed. In some embodiments, the method of manufacturing an apparatus as described herein comprises an injection molding process. In some embodiments, the method of manufacturing an apparatus as described herein comprises a solvent coating process. In some embodiments, the method of manufacturing an apparatus as described herein comprises a 3D printing process. In some embodiments, the method of manufacturing an apparatus as described herein can comprise an injection molding process, a solvent coating process, a 3D printing process, or any combination thereof. In some embodiments, the method of manufacturing an apparatus can comprise extruding platform material in the form of extruded tubing.

EXAMPLES

The specific dimensions of any of the apparatuses, methods, kits, and components thereof, of the present disclosure can be readily varied depending upon the intended application, as will be apparent to those of skill in the art in view of the disclosure herein. Moreover, it is understood that the examples and aspects described herein are for illustrative purposes only and that various modifications or changes in light thereof can be suggested to persons skilled in the art and are included within the spirit and purview of this application and scope of the appended claims. Numerous different combinations of aspects described herein are possible, and such combinations are considered part of the present disclosure. In addition, all features discussed in connection with any one aspect herein can be readily adapted for use in other aspects herein. The use of different terms or reference numerals for similar features in different aspects does not necessarily imply differences other than those expressly set forth. Accordingly, the present disclosure is intended to be described solely by reference to the appended claims, and not limited to the aspects disclosed herein.

Example 1

Elastomer Changes Following Mineral Oil Bath Test

This example describes a procedure for simulating ear canal exposure in an ex vivo setting. This protocol provides details for testing materials to provide accelerated, and optionally head-to-head comparisons of a variety of 3D-printed polymeric materials to fluid uptake or changes in material properties when exposed to the chemical environment of the ear canal.

ChronoSil® 75A, 10% silicone that has been thermally processed by blown molding but is in the tubular area of the mold and has a regular cylindrical geometry serves as a control. Samples for testing of swelling and dimensional changes (also referred to herein as coupons) have initial dimensions of 12.5×37.5 mm with a thickness of 500 microns. Coupons are measured for length and width using calipers, and thickness using a snap gauge. Coupons are weighed using an analytical balance.

The test bath is prepared using 25 grams (10 wt %) of Synthetic Cerumen, 25 grams (10 wt %) of EN1811 Sweat, and 200 grams (80 wt %) mineral oil. The Synthetic Cerumen is prepared by mixing 240 grams (44.4 wt %) Lanolin, 120 grams (22.2 wt %) palmitic Acid, 60 grams (11.1 wt %) myristic acid, 60 grams (11.1 wt %) oleic acid, 60 grams (11.1 wt %) linoleic acid, and 0.1 grams Vitamin E. The EN1811 Sweat is prepared by mixing an aqueous solution containing 5.00 g/L (0.50 wt %) NaCl, 1.00 g/L (0.10 wt %) urea, 1.00 g/L (0.10 wt %) DL-lactic acid, and trace amounts of $NH_4OH$ sufficient to adjust the pH to approximately 6.6.

A glass beaker with the simulated canal exposure solution is placed on a hot plate with a stirrer and a thermometer. The solution temperature is maintained at either 37±2° C. for standard test conditions, or 60±2° C. for accelerated test conditions.

Material samples are conditioned in deionized water, and preliminary dimensional and weight measurements are taken. Samples are submerged into the solution, and stirring is contained at 300±50 rpm in order to maintain a singular emulsion phase. Length, width, thickness, and weight changes are measured at 1 day, 2 days, 5 days, and 16 days in standard conditions (at 5 hours, 10 hours, 1 day, and 3 days in accelerated conditions). Samples are blotted dry with a lint-free cloth prior to measuring.

In some instances, the testing samples are prepared in dog bone shape, with specific dimensions depending on the modulus of the material, such that the target test load is less than 100 N. Dog bone shaped samples are used for tensile testing. Dog bones are measured for tensile modulus after the final time point of the study (i.e., 16 days for standard conditions, and 3 days for accelerated conditions).

Samples of materials are tested for hardness using a durometer gage, both in dry state and after fluid exposure. Materials showing favorable outcomes are further studied as printed 3D perimeter platforms, which are dusted (if needed) and scanned before and after immersion in water and test bath.

Tested materials are compared to reference materials that are not exposed to the bath test, and percent changes of weight, thickness, and Young's modulus are determined.

Desirable materials do not undergo substantial changes in dimensions, weight, or mechanical properties after exposure to substances commonly encountered in the ear canal, including water, sweat, mineral oil, and cerumen.

Example 2

Characterization of Elastomer Tensile Strength

This example describes a procedure for testing materials for use in apparatus described herein. This procedure is used to characterize favorable qualities relating to the tensile strength of materials.

Dog bone samples, as described in Example 1, are printed and UV-cured. A 500-N load cell on an IMADA tensile test stand is used. Cross-head speed is set to 25 mm/min. Prior to testing, samples are measured for width and thickness. Each sample is loaded into the upper grip, and attached to the lower grip. Activation of the instrument provides a force, and the load force is recorded (N), along with travel distance (inches) and stress (MPa).

Five ChronoSil® 75A samples that were thermoformed and were tested to determine tensile strength, following exposure to test bath conditions (16 day standard conditions, as described in Example 1). Initial measurements are provided in Table 1.

TABLE 1

| Sample No. | Weight (g) | Length (mm) | Width (mm) | Thickness (mm) |
|---|---|---|---|---|
| Sample 1 | 0.0339 | 15.86 | 8.29 | 0.22 |
| Sample 2 | 0.0404 | 15.79 | 8.63 | 0.25 |
| Sample 3 | 0.0291 | 15.21 | 7.62 | 0.23 |
| Sample 4 | 0.0435 | 16.81 | 9.41 | 0.23 |
| Sample 5 | 0.0315 | 16.31 | 8.67 | 0.22 |

Figure 7:
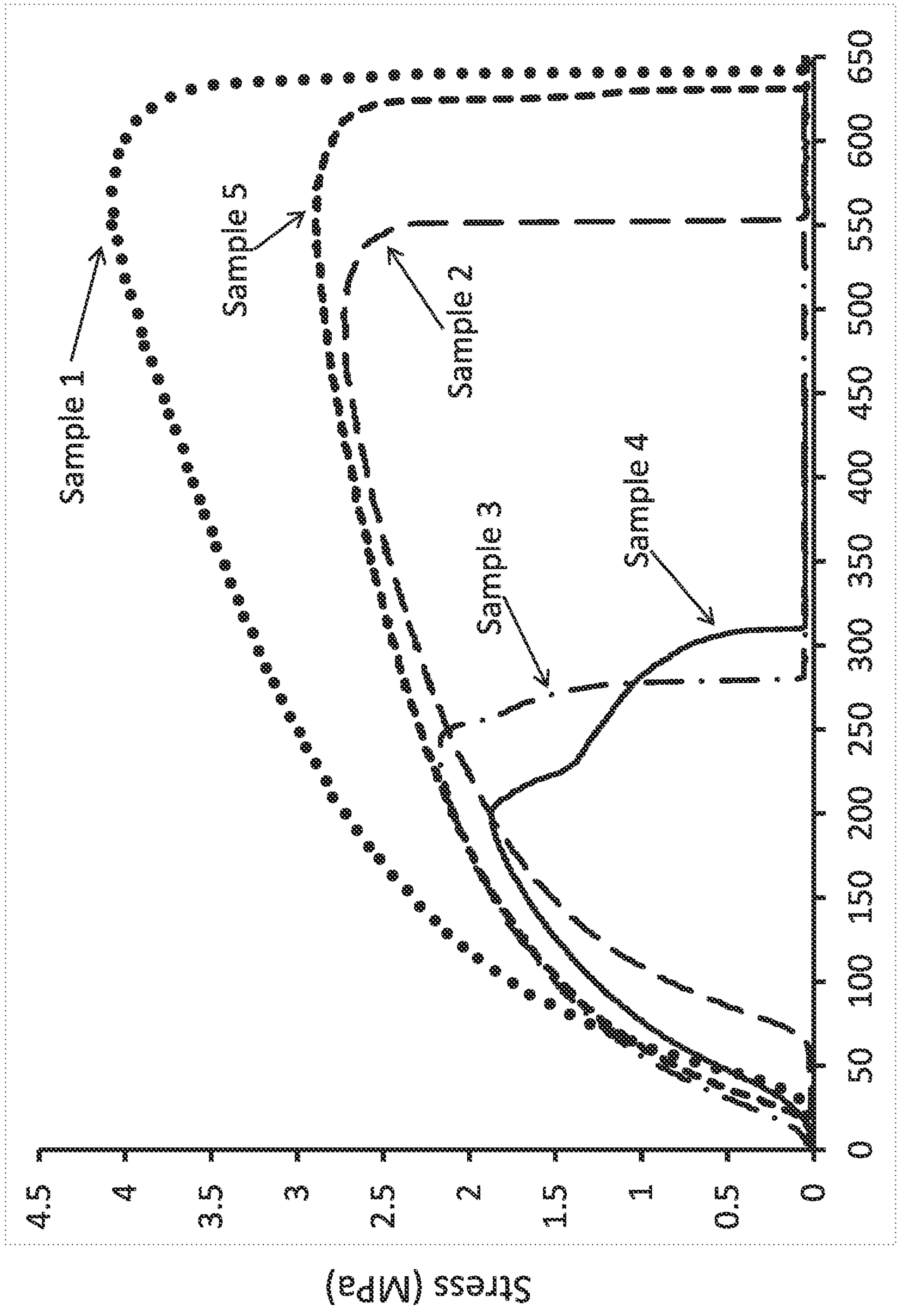
FIG. 7 is a chart displaying example tensile stress-strain curves for material samples.

As shown in FIG. 7, force was recorded as samples were stretched to induce strain. FIG. 7 depicts stress-strain curves for the ChronoSil® 75A samples. Peak force was recorded and noted. Tensile strength was calculated by dividing the peak force of each sample by the sample's thickness and width. The calculated tensile strengths are provided in Table 2.

TABLE 2

| Sample No. | Peak Force (N) | Tensile Strength (MPa) |
|---|---|---|
| Sample 1 | 7.44 | 4.07939 |
| Sample 2 | 5.90 | 2.73465 |
| Sample 3 | 3.80 | 2.16821 |
| Sample 4 | 4.60 | 1.88016 |
| Sample 5 | 5.52 | 2.89399 |

Through this protocol, tensile strength of sample materials can be determined. This procedure can similarly be used to determine information relating to materials' elastic region characteristics (e.g., Young's modulus and yield strength) and plastic region characteristics (e.g., strain hardening, necking, and fracture).

While the preferred embodiments of the devices and methods have been described in reference to the environment in which they were developed, they are merely illustrative of the principles of the present inventive concepts. Modification or combinations of the above-described assemblies, other embodiments, configurations, and methods for carrying out the invention, and variations of aspects of the invention that are obvious to those of skill in the art are intended to be within the scope of the claims. In addition, where this application has listed the steps of a method or procedure in a specific order, it may be possible, or even expedient in certain circumstances, to change the order in which some steps are performed, and it is intended that the particular steps of the method or procedure claim set forth here below not be construed as being order-specific unless such order specificity is expressly stated in the claim.

REFERENCE NUMBERS

| Number | Element |
|---|---|
| 100 | Contact Hearing Device (Tympanic Lens) |
| 130 | Photodetector |
| 140 | Transducer |
| 150 | Sulcus Platform |
| 155 | Perimeter Platform |
| 170 | Chassis |
| 180 | Bias Springs |
| 190 | Grasping Tab |
| 200 | Drive Post |
| 210 | Adhesive |
| 220 | Umbo Lens |
| 225 | Oil Layer |
| 240 | Membrane |
| 350 | Transducer Reed |
| 360 | Ridges (3D Printing |
| BN | Boney Portion |
| TA | Tympanic Annulus |
| TM | Tympanic Membrane |
| EC | Ear Canal |
| UM | Umbo |

What is claimed is:

1. An apparatus of a contact hearing device, the apparatus comprising:

a transducer for driving an eardrum of a user of the contact hearing device;

a first curved retention surface disposed along a perimeter of a chassis supporting the transducer, the first curved retention surface having a curvature corresponding to a first portion of an ear canal of the user; and a second curved retention surface disposed along the perimeter of the chassis and opposite from the first curved retention surface, the second curved retention surface having a curvature corresponding to a second portion of an ear canal of the user;

wherein the transducer extends through an aperture defined between the first and second curved retention surfaces and towards the eardrum of the user.

2. The apparatus of claim 1, wherein the curvature of the first curved retention surface corresponds to a shape configured to maintain a location of the transducer relative to the eardrum of the user, and wherein the curvature of the first curved retention surface is uniquely molded to a shape of the anatomy of the first portion of the ear canal of the user.

3. The apparatus of claim 1, wherein the curvature of the second curved retention surface corresponds to a shape configured to maintain a location of the transducer relative to the eardrum of the user, and wherein the curvature of the second curved retention surface is uniquely molded to a shape of the anatomy of the second portion of the ear canal of the user.

4. The apparatus of claim 1, wherein the first curved retention surface comprises:

an inner surface oriented towards an inner surface of the second curved retention surface; and an outer surface oriented towards the first portion of the ear canal of the user.

5. The apparatus of claim 1, wherein the second curved retention surface comprises:

an inner surface oriented towards an inner surface of the first curved retention surface; and an outer surface oriented towards the second portion of the ear canal of the user.

6. The apparatus of claim 1, wherein one or more of the curvature or a shape of the first curved retention surface is different from a corresponding one or more of the curvature or a shape of the second curved retention surface.

7. The apparatus of claim 1, wherein the transducer extends through the aperture defined between the first and second curved retention surfaces to contact the eardrum of the user.

8. The apparatus of claim 1, wherein an opening of the aperture is oriented in a direction towards the eardrum of the user.

9. The apparatus of claim 1, wherein an opening of the aperture is centered about an umbo of the eardrum, and the transducer drives an umbo lens positioned on the umbo.

10. The apparatus of claim 9, wherein the umbo lens is held in position on the umbo based on:

contact between the first curved retention surface and a first ear canal portion surrounding the eardrum adjacent to the first curved retention surface; and contact between the second curved retention surface and a second ear canal portion surrounding the eardrum adjacent to the first curved retention surface.

11. The apparatus of claim 1, wherein the first and second curved retention surfaces are included in a retention structure of the apparatus.

12. The apparatus of claim 1, wherein the first and second curved retention surfaces are included in a continuous surface disposed along the perimeter of the chassis supporting the transducer.

13. The apparatus of claim 1, wherein the first and second curved retention surfaces are included in a discontinuous surface disposed along the perimeter of the chassis supporting the transducer.

14. The apparatus of claim 1, wherein the first curved retention surface includes a layer of elastomer, wherein the elastomer has a hardness of between 0 A and 100 A, and a thickness of between approximately 25 microns and approximately 500 microns.

15. The apparatus of claim 1, wherein the second curved retention surface includes a layer of elastomer, wherein the elastomer has a hardness of between 0 A and 100 A, and a thickness of between approximately 25 microns and approximately 500 microns.

16. The apparatus of claim 1, wherein one or more of the first curved retention surface or the second curved retention surface includes a plurality of ridges disposed on a respective outer face.

* * * * *